Patented July 6, 1937

2,085,779

UNITED STATES PATENT OFFICE 2,085,779

DENATURED ALCOHOL

John C. Woodhouse, Wilmington, Del., assignor to E. I. du Pont de Nemours & Company, Wilmington, Del., a corporation of Delaware No Drawing. Application November 7, 1932, Serial No. 641,611. Renewed October 3, 1936

17 Claims. (Cl. 202—77)

This invention relates to denatured alcohols and more particularly to new and improved denatured alcohol compositions of an unpotable but at the same time scientifically and commercially utilizable character.

It is an object of the present invention to provide a new and improved denatured alcohol composition.

Other objects and advantages of the invention will be apparent by reference to the following specification wherein the details and preferred embodiments are described.

According to the present invention a denatured ethyl-alcohol is prepared containing the dehydrogenation products of the mixture of liquid oxygen-containing organic compounds, or fractions thereof, boiling above methanol, obtainable in the known synthesis of methanol and higher alcohols by catalytic hydrogenation of oxides of carbon under pressure. Furthermore, according to this invention, a denatured ethyl-alcohol is prepared containing the dehydrogenation products of secondary aliphatic alcohols, other than and/or including those produced during the known synthesis of methanol and higher alcohols by catalytic hydrogenation of oxide of carbon under pressure. The production of the dehydrogenation products of the secondary alcohols and/or of the mixture of liquid oxygen-containing organic compounds, or fractions thereof, boiling above methanol, and obtainable as hereinbefore described may, according to this invention, be prepared under normal pressures or under increased pressures and at relatively low or elevated temperatures. The production of the dehydrogenation products of this invention will be described in detail hereinafter.

The synthesis of the mixture of liquid oxygen-containing organic compounds, or fractions thereof, boiling above methanol, and obtainable in the known synthesis of methanol and of higher alcohols by catalytic hydrogenation of oxide of carbon under pressure, may be effected, for example by passing a mixture of hydrogen and carbon monoxide, as, say in the volume ratio of 2–1 at above two hundred atmospheres pressure and at a temperature within the range of 400–600° C., over a zinc-chromium catalyst to which purposely a small amount of alkali is added. The catalyst may be prepared by the general method described in Lazier U. S. 1,746,782. Other catalysts, as well as methods for their preparation and use in the synthesis of methanol and higher alcohols, are described in the following patents: Lazier—1,746,- 781; 1,746,783; 1,829,046; Larson—1,844,587; Storch—1,681,750; 1,681,752; 1,738,971; Williams Reissue 18,302. The condensate obtained by cooling the gaseous products comprises, after separation of the water formed, methanol together with alcohols of higher molecular weight and some unidentified oxygen-containing organic compounds.

Among the higher alcohols, boiling above methanol, such as hereinbefore described, there have been identified normal propanol, isobutanol, pentanol-2, pentanol-3, 2-methyl pentanol-3, 2-methyl pentanol-4, 2,5-dimethyl hexanol-3, and 4-methyl pentanol-2, 2-methyl butanol-1, 3-methyl butanol-2, 2,4-dimethyl pentanol-3, 3-methyl pentanol-2, 2-methyl pentanol-1, 2,4-dimethyl pentanol-1, and 4-methyl hexanol-1. There are present also numerous other primary and secondary alcohols containing from 5–14 carbon atoms all of which have not as yet been identified. I have found that a desirable denaturant may be prepared by subjecting the crude mixture of methanol and higher alcohols together with other unidentified oxygen-containing organic compounds, to dehydrogenation under relatively elevated pressure. According to another feature of my invention, by fractional distillation the methanol is separable from the material boiling above it and the higher alcohols remaining, together with other unidentified organic oxygen-containing compounds, are subjected to oxidation or dehydrogenation under normal or elevated temperatures and pressures according to my invention. These dehydrogenated higher alcohols, together with other unidentified oxygen-containing organic compounds, at least small quantities of hydrocarbons, and with or without higher alcohols not dehydrogenated, comprise the denaturant of the present invention.

If the dehydrogenation products of secondary aliphatic alcohols are utilized, according to my invention, the vapors of such secondary aliphatic alcohols are preferably passed over a catalyst active for dehydrogenation, at a relatively high temperature and under pressure, whereby the secondary alcohol is converted, partially at least, into higher ketones, and containing a substantial part of mesitylene, furone and of unidentified higher boiling oils in addition thereto. Altho dehydrogenation catalysts generally are suitable for the reaction according to this invention, it has been found that catalysts such as those described by Lazier in U. S. 1,746,782—1,746,783—and 1,857,921 are particularly suitable.

It will be understood that, altho specific mention has been made of catalytic methods of hydrogen removal by means of dehydrogenation, other methods of obtaining the same objective, i. e. hydrogen removal and condensation, may be utilized, for example, such as oxidation.

It has previously been proposed to utilize various ketones as denaturing agents, but I have found that the mixture of dehydrogenation products, containing ketones but also containing substantial quantities of other unidentified materials produced during the dehydrogenation of secondary aliphatic alcohols, are unexpectedly more efficacious than the ketones and like materials heretofore proposed.

These dehydrogenated materials, with or without alcohols partially or not dehydrogenated, comprise the denaturant of the present invention.

As is well known, when primary alcohols are dehydrogenated or oxidized they are converted mainly into aldehydes and when secondary alcohols are subjected to a similar dehydrogenation they are converted mainly into ketones. The denaturant or dehydrogenation product of my invention, therefore, may be characterized as containing ketones, or aldehydes and ketones. As previously stated, however, there are other unidentified oxygen-containing organic compounds in the mixture of oxygen-containing organic materials obtainable by reaction of hydrogen and carbon oxide as previously described, and consequently my invention should not be limited in characterization to a content of aldehydes and ketones alone as denaturants. Also when secondary alcohols are dehydrogenated under pressure at an increased temperature, the dehydrogenation products comprise ketones of a higher number of carbon atoms than the alcohol from which they are derived together with substantial quantities of unidentified higher boiling oils and hence my invention should not be limited in characterization to a content of ketones alone but rather it should be broadly described with reference to secondary alcohols as a denatured alcohol containing the products obtained by catalytically dehydrogenating secondary aliphatic alcohols under pressure and relatively elevated temperature.

Altho the complete mixture of products boiling above methanol, obtainable as hereinbefore described, is suitable and desirable for use in the preparation of the denaturant of my invention, I have found that the dehydrogenation products of fractions of said mixture are also efficacious and admirably fitted for denaturing ethyl alcohol. Thus, for example, I have found that the dehydrogenation product of that fraction boiling in a range between 104–195° C., or again that fraction boiling in the more limited range between about 110–147° C., are highly suitable as denaturants.

It has been found that, altho the utilization of conditions of pressure and temperature may be advantageously applied in all cases, they are highly important in obtaining satisfactory dehydrogenations and condensations, i. e. production of higher ketones containing a higher number of carbon atoms than the alcohols from which they are derived, of the secondary aliphatic alcohols, according to this invention. Thus, for example, as the pressures are increased during the reaction, so do the yields of higher ketones and other unidentified organic compounds increase, and it has been found that pressures of the nature of, say, 100 lbs. per sq. in. are satisfactory, whereas as the pressures are lowered substantially below that figure the yields of ketones and unidentified organic materials tend to diminish. It is also necessary, in treating secondary aliphatic alcohols, according to this invention, to maintain conditions of relatively high temperatures ranging up, for example, from about 300° C.

It should also be understood that according to the broad aspects of my invention highly efficacious denaturing agents may be obtained by subjecting any or all of the specific fractions of the crude material obtained, as hereinbefore described, by catalytic hydrogenation of carbon oxide under pressure, to catalytic dehydrogenation under normal or elevated pressure and under increased temperature.

The very diverse and complex nature of the products produced by removal of hydrogen from and condensation of the alcohols and oxygen-containing organic compounds obtainable as previously described contributes greatly to the efficacy and potency in denaturant characteristics of the material of my invention, containing as it may a mixture of aldehydes, ketones, esters, and unidentified oxygen-containing organic compounds. Compared with the efficacy of denaturants heretofore proposed, the denatured alcohol compositions according to my invention possess highly improved characteristics especially from the standpoint of difficulty of denaturant removal.

Except for the purposes of a beverage, however, the denatured alcohol of my invention can be used for most purposes for which alcohol is suitable, the product possessing substantially the same solvent and solubility properties and fuel values.

As added advantages of my invention, my denaturant (1) is distasteful and nauseating in very small proportions in the denatured alcohol composition; (2) causes a masking or loss of ethyl alcohol taste; (3) is miscible in all proportions with alcohol; (4) leaves no objectionable residue upon evaporation; (5) is readily available and relatively inexpensive; and (6) small amounts thereof are sufficient to produce the above described effects.

The proportions of my denaturant used with alcohol may vary over a wide range as may the dehydrogenation products of various fractions of the hereinbefore described mixtures of differing boiling points of higher alcohols, and oxygen-containing organic compounds. Generally speaking, only small amounts of my denaturant are required, ethyl alcohol containing as little as 1% or even less being quite unpotable. At the same time, within certain limits, the larger the proportion of denaturant the more distasteful the product and the more difficult the separation of denaturant therefrom.

For purposes of illustration only and not by way of limitation, the following examples are given:

*Example 1.*—Of the liquid mixture of products, boiling above methanol and obtainable in the known synthesis of methanol and higher alcohols by catalytic hydrogenation of oxide of carbon under pressure, 70.1 gallons of a fraction thereof boiling between 147–157° C., were vaporized and passed over a catalyst active for dehydrogenation, such as a Zn-Cu-Cr-Cd containing catalyst, at a temperature of 350° C., and under a pressure of 1 atmosphere at a space velocity corresponding to 2 volumes of liquid per volume of catalyst per hour. There are evolved about 1200 cubic feet of hydrogen admixed with 0.2% $CO_2$ and 0.2% CO. The condensed dehydrogenated liquid product was submitted to fractional distillation and yielded 48 gallons of material comprising aldehydes, ketones and other unidentified hydrocarbons and oxygen-containing organic compounds boiling between 66–147° C.

This material, when added to ethyl alcohol in the proportion of about 3 gallons of material per 100 gallons of alcohol, was highly efficacious as a denaturant, possessing the desirable denaturing characteristics such as hereinbefore described.

Example 2.—Of the mixture of liquid products, boiling above methanol and obtained in the known synthesis of methanol and higher alcohols by catalytic hydrogenation of oxide of carbon under pressure, 1980 c. c. of that fraction boiling between 200–230° C., were dehydrogenated under substantially the same conditions as in Example 1. From 1600 c. c. of the dehydrogenated product, which was submitted to fractional distillation, there was obtained 500 c. c. of material boiling between 42–101° C., at 25 m. m. pressure, which was composed mainly of aldehydes and smaller quantities of unidentified organic compounds.

This material, when added to ethyl alcohol in the proportion of about 3 gallons of material per 100 gallons of alcohol, was highly efficacious as a denaturant, possessing the desirable denaturing characteristics such as hereinbefore described.

Example 3.—28 gallons of still residue boiling above 147° C., and remaining after the fractional distillation described in Example 1, and containing unconverted alcohols together with esters formed during the previous dehydrogenation were passed over a dehydrogenating catalyst under substantially the same conditions of temperature, pressure and space velocity described in the dehydrogenation of Example 1. Approximately 300 cu. ft. of hydrogen was evolved and the condensed dehydrogenated product was fractionated to give about 10 gallons of material boiling between 64–148° C.

This material, when added to ethyl alcohol in the proportion of 3 gallons of material per 100 gallons of alcohol, was highly efficacious as a denaturant, possessing the desirable denaturing characteristics such as hereinbefore described.

Example 4.—100 parts by weight of isopropanol are vaporized in a closed vessel and the vapors are passed, under a pressure of 100 lbs. per sq. in., thru a reaction chamber maintained at a temperature of about 367° C., and over a zinc-copper-cadmium-chromite catalyst, at the rate of four volumes of vapor per volume of catalyst per hour. The vapors, after passing thru the reaction chamber and in contact with the catalyst, are condensed to a liquid product containing about 44.6 parts of methyl-iso-butyl-ketone, 20.5 parts acetone, and 19.5 parts of unidentified higher boiling oils.

This material is highly efficacious as a denaturing agent, possessing the desirable denaturing characteristics such as hereinbefore described, and when added in the proportions of 3 gallons of material per 100 gallons of alcohol will give a completely denatured material suitable for the purposes of a denatured alcohol.

Altho the examples have dealt specifically with methods of dehydrogenation, it will be understood that the products produced by methods of hydrogen removal by means of oxidation are likewise as efficacious as denaturants and their preparation by oxidation are comprised within my invention. It will be understood, therefore, that where mention is made in the specification or the appended claims of dehydrogenation products the term shall be construed to include said products whether obtained by oxidation (for hydrogen removal) or by strict dehydrogenation as such.

Various changes may be made in the proportions of materials and in the specific fractions of alcohols and oxygen-containing organic compounds mixtures which are present and/or dehydrogenated to give the denaturant utilized according to this invention, without departing from the invention or sacrificing any of the advantages thereof. Also, if desired, the denaturants hereinbefore described may be used along with other denaturants, e. g. organic nitrogen bases, methanol, acetone, kerosene, petroleum oxidation products, terpenic bodies, halogenated organic derivatives, e. g. chlorinated phenols, etc.

I claim:

1. Denatured ethyl alcohol comprising ethyl alcohol and a mixture, consisting substantially of aldehydes, esters, and ketones, of the liquid dehydrogenation products of oxygen-containing compounds, boiling above methanol, obtainable in the synthesis of methanol and higher alcohols by catalytic hydrogenation of oxide of carbon under pressure, as a denaturant.

2. Denatured ethyl alcohol comprising ethyl alcohol and a mixture, consisting substantially of aldehydes, esters, and ketones, of the liquid dehydrogenation products of the oxygen-containing organic compounds boiling in the range of from about 104–195° C., obtainable in the synthesis of methanol and higher alcohols by catalytic hydrogenation of oxide of carbon under pressure, as a denaturant.

3. Denatured ethyl alcohol comprising ethyl alcohol and a mixture, consisting substantially of aldehydes, esters and ketones, of the liquid dehydrogenation products of the oxygen-containing organic compounds boiling in the range of from about 110–147° C., obtainable in the synthesis of methanol and higher alcohols by catalytic hydrogenation of oxide of carbon under pressure, as a denaturant.

4. Denatured ethyl alcohol comprising ethyl alcohol and a mixture, consisting substantially of aldehydes, esters, ketones and alcohols, of the at least partly dehydrogenated liquid oxygen-containing organic compounds boiling above methanol obtainable in the synthesis of methanol and higher alcohols by catalytic hydrogenation of oxide of carbon under pressure, as a denaturant.

5. Denatured ethyl alcohol comprising ethyl alcohol and a mixture, consisting substantially of aldehydes, esters, ketones and alcohols, of the at least partly dehydrogenated liquid oxygen-containing organic compounds obtainable in the synthesis of methanol and higher alcohols by catalytic hydrogenation of oxide of carbon under pressure, said liquid oxygen-containing organic compounds boiling in a range of from about 104–195° C., as a denaturant.

6. Denatured ethyl alcohol comprising ethyl alcohol and a mixture, consisting substantially of aldehydes, esters, ketones, and alcohols, of the at least partly dehydrogenated liquid oxygen-containing organic compounds obtainable in the synthesis of methanol and higher alcohols by catalytic hydrogenation of oxide of carbon under pressure, said liquid oxygen-containing organic compounds boiling in a range of from about 110–147° C., as a denaturant.

7. Denatured alcohol containing as a denaturant 1–5 gallons of a mixture, consisting substantially of aldehydes, esters, and ketones, of the liquid dehydrogenation products of the oxygen-containing organic compounds boiling above methanol, obtainable in the synthesis of methanol and higher alcohols by catalytic hydrogenation of oxide of carbon under pressure, per 100 gallons of alcohol.

8. Denatured alcohol containing as a denaturant 1–5 gallons of the mixture, consisting substantially of aldehydes, esters and ketones, of the liquid dehydrogenation products of the oxygen-containing organic compounds obtainable in the synthesis of methanol and higher alcohols by catalytic hydrogenation of oxide of carbon under pressure and boiling in the range of from about 104–195° C., per 100 gallons of alcohol.

9. Denatured alcohols containing as a denaturant 1–5 gallons of a mixture, consisting substantially of aldehydes, esters, ketones and alcohols, of the at least partly dehydrogenated liquid oxygen-containing organic compounds boiling above methanol obtainable in the synthesis of methanol and higher alcohols by catalytic hydrogenation of oxides of carbon under pressure, per 100 gallons of alcohol.

10. Denatured alcohol containing as a denaturant 1–5 gallons of a mixture, consisting substantially of aldehydes, esters, ketones, and alcohols, of the at least partly dehydrogenated liquid oxygen-containing organic compounds obtainable in the synthesis of methanol and higher alcohols by catalytic hydrogenation of oxides of carbon under pressure, and boiling in the range of from about 104–195° C., per 100 gallons of alcohol.

11. The method of denaturing ethyl alcohol which comprises adding thereto a mixture, consisting substantially of aldehydes, esters and ketones, of the liquid dehydrogenation products of the oxygen-containing organic compounds, boiling above methanol, obtainable in the synthesis of methanol and higher alcohols by catalytic hydrogenation of oxide of carbon under pressure.

12. The method of denaturing ethyl alcohol which comprises adding thereto a mixture, consisting substantially of aldehydes, esters and ketones, of the liquid dehydrogenation products of the oxygen-containing organic compounds obtainable in the synthesis of methanol and higher alcohols by catalytic hydrogenation of oxide of carbon under pressure and boiling in the range of from about 104–195° C.

13. The method of denaturing ethyl alcohol which comprises adding thereto a mixture, consisting substantially of aldehydes, esters and ketones, of the liquid dehydrogenation products of the oxygen-containing organic compounds obtainable in the synthesis of methanol and higher alcohols by catalytic hydrogenation of oxide of carbon under pressure and boiling in the range of from about 110–147° C.

14. The method of denaturing ethyl alcohol which comprises adding thereto 1–5 gallons of a mixture, consisting substantially of aldehydes, esters, and ketones of the liquid dehydrogenation product of the oxygen-containing organic compounds, boiling above methanol, obtainable in the synthesis of methanol and higher alcohols by catalytic hydrogenation of oxide of carbon under pressure, per 100 gallons of ethyl alcohol.

15. The method of denaturing ethyl alcohol which comprises adding thereto a mixture, consisting substantially of aldehydes, esters, ketones and alcohols, of the at least partly dehydrogenated liquid oxygen-containing organic compounds boiling above methanol obtainable in the synthesis of ethanol and higher alcohols by catalytic hydrogenation of oxides of carbon under pressure.

16. Denatured ethyl alcohol comprising ethyl alcohol and a mixture, consisting substantially of aldehydes, esters and ketones, of the liquid dehydrogenation products of secondary aliphatic alcohols, obtainable by the catalytic dehydrogenation of said secondary aliphatic alcohols under elevated temperature and pressure, as a denaturant.

17. Denatured ethyl alcohols comprising ethyl alcohol and a mixture, consisting substantially of methyl isobutyl ketone and acetone, of the liquid dehydrogenation product of isopropyl alcohol, obtainable by the catalytic dehydrogenation of isopropyl alcohol under elevated temperature and pressure, as a denaturant.

JOHN C. WOODHOUSE.